United States Patent [19]

Kishi et al.

[11] Patent Number: 4,816,428

[45] Date of Patent: Mar. 28, 1989

[54] PROCESS FOR PRODUCING HIGH STRENGTH βSIALON-SILICON CARBIDE COMPOSITE

[75] Inventors: Kazushi Kishi; Seiki Umebayashi; Eiji Tani; Kazuo Kobayashi, all of Saga, Japan

[73] Assignee: Agency of Industrial Science and Technology, Tokyo, Japan

[21] Appl. No.: 80,243

[22] Filed: Jul. 28, 1987

Related U.S. Application Data

[63] Continuation of Ser. No. 828,930, Feb. 12, 1986, abandoned.

[30] Foreign Application Priority Data

Feb. 14, 1985 [JP] Japan .................................. 60-27828

[51] Int. Cl.$^4$ .............................................. C04B 35/58
[52] U.S. Cl. ......................................... 501/89; 501/98
[58] Field of Search ....................... 501/98, 97, 89, 92; 423/327

[56] References Cited

U.S. PATENT DOCUMENTS

| | | | |
|---|---|---|---|
| 3,974,106 | 8/1976 | Richerson | 501/97 X |
| 4,172,108 | 10/1979 | Maeda | 501/98 X |
| 4,243,621 | 1/1981 | Mori et al. | 501/89 X |
| 4,578,363 | 3/1986 | Campos-Loriz | 501/89 |

FOREIGN PATENT DOCUMENTS

| | | | |
|---|---|---|---|
| 2805292 | 3/1979 | Japan | 501/98 |
| 58-9882 | 1/1983 | Japan | 501/89 |
| 58-84914 | 5/1983 | Japan | 501/98 |
| 59-207881 | 11/1984 | Japan | 501/98 |
| 59-232972 | 12/1984 | Japan | 501/98 |
| 60-108371 | 6/1985 | Japan | 501/98 |
| 60-145961 | 8/1985 | Japan | 501/97 |
| 60-246268 | 12/1985 | Japan | 501/98 |
| 61-97165 | 5/1986 | Japan | 501/89 |
| 61-186208 | 8/1986 | Japan . | |
| 2157282 | 10/1985 | United Kingdom | 501/98 |

Primary Examiner—William R. Dixon, Jr.
Assistant Examiner—Ann M. Knab
Attorney, Agent, or Firm—Jordan and Hamburg

[57] ABSTRACT

A process for producing a β-sialon.silicon carbide complex includes mixing silicon nitride and silicon carbide with an aluminum alkoxide solution or a soluble aluminum salt solution and using the resulting homogeneous mixture as a starting material in forming a sintered body. The aluminum alkoxide solution or aluminum salt solution penetrates into the surface of each particle of the silicon nitride and silicon carbide, whereby the whole surface of each nitride and carbide particle is covered with aluminum alkoxide solution or aluminum salt solution, and homogeneous mixing is achieved. Therefore, defects such as pores, clusters of large grains, or unsintered parts are eliminated and the strength of the final sintered bodies is improved.

8 Claims, No Drawings

PROCESS FOR PRODUCING HIGH STRENGTH βSIALON-SILICON CARBIDE COMPOSITE

This application is a continuation of application Ser. No. 828,930, filed Feb. 12, 1986, now abandoned.

BACKGROND OF THE INVENTION

The present invention relates to a process for producing heat-resisting ceramic sintered bodies having high strength.

β-sialon sintered bodies are usually produced by mixing silicon nitride powder and alumina powder, or silicon nitride powder, alumina powder and aluminum nitride powder, and then sintering the mixed powders by hot pressing or under condition of 1700°–2000° C. at atmosphere pressure. However, a completely uniform mixed powder for raw materials is hardly obtained by merely mixing the powders themselves. Defects such as pores, clusters or large grains, or unsintered parts arise in the sintered bodies and sintered bodies having high strength are not obtained.

The present inventors have developed a method for composing silicon carbide to β-sialon for the purpose of developing strength of β-sialon. However, silicon carbide is still added to the above-mentioned starting raw materials of β-sialon, heterogeneity of the mixture further becomes remarkable and it is hard to see the effect of development of strength by composing silicon carbide.

SUMMARY OF THE INVENTION

It is an object of the present invention to provide β-sialon.silicon carbide complexes having high strength and complete uniform mixed powder using aluminum, in which aluminum is the condition of solution.

An object of the present invention is achieved by the usual sintering method using the mixture as starting raw materials, in which silicon nitride and silicon carbide are mixed with aluminum alkoxide solution, aluminum hydroxide aqueous solution or soluble aluminum salt solution.

DETAILED DESCRIPTION OF THE PREFERRED EMBODIMENTS

Reaction of

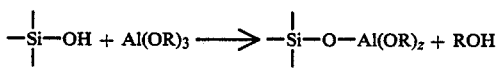

is caused by an

layer which is produced by oxidation or hydrolysis on the surface of silicon nitride or silicon carbide and aluminum alkoxide {Al(OR)₃}, achieved by mixing an aluminum alkoxide solution and silicon nitride or silicon carbide according to the present invention. A homogeneous mixture at the level of each powder particles is achieved. Aluminum hydroxide particle dispersed in water as colloidal particles are adsorbed on the surface of silicon nitride and silicon carbide by mixing silicon nitride and silicon carbide in an aluminum hydroxide aqueous solution, each particle of silicon nitride powder and silicon carbide powder are wrapped by aluminum hydroxide gel at a process of drying, and a homogeneous mixture at the level of each particle is obtained. Next, when using a soluble aluminum salt, silicon nitride powder and silicon carbide powder are dried from the condition of silicon nitride powder and silicon carbide powder being suspended in the aluminum salt solution. These powders play nuclei roles at the time of depositing aluminum salt, the surface of the silicon nitride powder and silicon carbide powders are covered with aluminum salt as a result of the processing mentioned above, and a homogeneous mixture at the level of each particle is obtained. The real specific gravities of silicon nitride and silicon carbide are both 3.2 g/cm³ at each mixing mentioned above, and there are not any cases of separating at the steps of mixing or drying.

The reason for converting silicon carbide to β-sialon is the development in strength of the obtained sintered bodies. That is to say, the coefficient of thermal expansion of β-sialon is $2.9-3.4 \times 10^{-6}/°C.$, and that of silicon carbide is $4.3 \times 10^{-6}/°C$. In the composite sintered bodies, β-sialon is stretched by silicon carbide at a process of cooling and compressive stresses are applied to the whole of the sintered bodies because of the difference of the coefficient of thermal expansion of β-sialon and silicon carbide. Therefore, high strength and compressive stresses of the sintered bodies themselves are required if the composite sintered bodies are ruptured by external stresses, and strength of the composite sintered bodies becomes much higher. Therefore, the strength the composite sintered bodies become much higher as a lot of silicon carbide and high strength of β-sialon forms a matrix.

Additionally, it is possible to use whiskers or fibrous materials, not only powder materials, as the silicon carbide, and high strength and toughness are also observed by using whiskers or the fibrous materials as silicon carbide. As a result, further uniform mixtures are obtained by using the composite powder of silicon nitride and silicon carbide.

The present invention is exemplified in the following examples of embodiments of the invention.

EMBODIMENT 1

Ninteen point zero five (19.05) g of aluminum isopropoxyde [Al{OCH(CH₃)₂}₃] was dissolved to 500 ml of n-hexane, 48.02 g of silicon nitride (Si₃N₄) and 16.77 g of silicon carbide (SiC) were added in the above-mentioned n-hexane. And the mixture mixed in a ballmill for 6 hours. The mixed suspension was spray-dried at 70° C. inlet temperature and 40° C. outlet temperature, with 0.3 m³/min dry air. The dry powder was calcined at 300° C. for 1 hour in air. Twenty (20) g calcined powder was hot pressed at 1850° C. for 1 hour under 300 Kg/cm² of the pressure in carbon dies 30 mm×30 mm square, and thus sintered bodies were obtained.

The properties of the obtained sintered bodies are shown in the following Table 1.

TABLE 1

| COM-POSITION | DENSITY (g/cm³) | BENDING STRENGTH (Kg/mm²) | | PRODUCTION PHASE |
|---|---|---|---|---|
| | | R. T. | 1200° C. | |
| Z = 0.5 | 3.16 | 148.3 | 144.6 | β' + O' + SiC |

TABLE 1-continued

| COM-POSITION | DENSITY (g/cm³) | BENDING STRENGTH (Kg/mm²) R. T. | 1200° C. | PRODUCTION PHASE |
|---|---|---|---|---|
| SiC = 20 wt % | | | | |

EMBODIMENT 2

Nineteen point zero five (19.05) g of aluminum isopropoxyde [Al{OCH(CH₃)₂}] was dissolved in 500 ml of tetrahydrofuran. 48.02 g of silicon nitride (Si₃N₄) and 16.77 g of silicon carbide (SiC) were added to the above-mentioned tetrahydrofuran, and the mixture was mixed in ultrasonic cleaning equipment for 2 hours. The suspension was heated and Al{OCH(CH₃)₂}₃ was hydrolyzed by adding dropwise 10 drops from 500 ml of distilled water every minute. Tetrahydrofuran was removed from the suspension by heating. The suspension consisting of Si₃N₄ and aluminum hydroxide, was cooled, controlled to pH 2 with diluted hydrochloric acid, and peptized by stirring a whole day and night. The peptized suspension was formed into small balls, each having a radius of 0.5 mm, and then was freeze-dried. The dried powder was calcined at 300° C. for 1 hour air. 20 g of the calcined powder was hot pressed at 1850° C. for 1 hour under 300 Kg/cm² pressure in carbon dies 30 mm×30 mm square, and thus the sintered bodies were obtained.

The properties of the obtained sintered bodies are shown in the following Table 2.

TABLE 2

| COM-POSITION | DENSITY (g/cm³) | BENDING STRENGTH (Kg/mm²) R. T. | 1200° C. | PRODUCTION PHASE |
|---|---|---|---|---|
| Z = 0.5 SiC = 20 wt % | 3.16 | 144.4 | 146.2 | β° + O° + SiC |

EMBODIMENT 3

Twenty-eight point zero eight (28.08) g of aluminum ethoxide {Al(OCH₂CH₃)₃} was hydrolyzed by adding 500 ml of boiling distilled water. The hydrolyzed solution was cooled, controlled to a pH of 2 with diluted hydrochloric acid, and peptized by stirring for an entire day and night. An aluminum hydroxide solution were obtained. Forty-one point one eight (41.18) g of silicon nitride (Si₃N₄) and 50.00 g of silicon carbide (SiC) was added to the obtained aluminum hydroxide solution, and the resulting aluminum hydroxide solution was mixed in ultrasonic cleaning equipment for 2 hours. The mixed suspension was spray-dried at 140° C. inlet temperature and 80° C. outlet temperature with 0.5 m³/min dry air. The dry powder was calcined at 600° C. for 1 hour in air. Twenty (20) g of the calcined powder was hot pressed at 1850° C. for 1 hour under 300 Kg/cm² pressure carbon dies having 30 mm×30 mm of a square, and thus the sintered bodies were obtained.

The properties of the obtained sintered bodies are shown in the following Table 3.

TABLE 3

| COM-POSITION | DENSITY (g/cm³) | BENDING STRENGTH (Kg/mm²) R. T. | 1200° C. | PRODUCTION PHASE |
|---|---|---|---|---|
| Z = 1 SiC = 50 wt % | 3.17 | 112.3 | 108.9 | β° + X + SiC |

EMBODIMENT 4

Fifty-three point zero (53.00) g of aluminum nitrate {Al(NO₃)₃.9H₂O} was dissolved in 500 ml of distilled water. 72.79 g of silicon nitride (Si₃N₄) and 20.00 g of silicon carbide (SiC) whiskers were added to the above-mentioned aluminum nitrate and the added mixture was mixed in a ballmill for 6 hours. The suspension was then formed into small balls, each having a radius of 0.5 mm, freeze-dried and calcined for 2 hours at 600° C. in air. Twenty (20) g of the calcined powder was hot pressed at 1850° C. for 1 hour under 300 Kg/cm² pressure in carbon dies 30 mm×30 mm of a square, and thus the sintered bodies were obtained.

The properties of the obtained sintered bodies are shown in the following Table 4.

TABLE 4

| COMPOSITION | STARTING MATERIALS | DENSITY (g/cm³) | BENDING STRENGTH (Kg/mm²) R. T. | 1200° C. | VALUES OF FRACTURE TOUGHNESS (MN$_m^{-3/2}$) | PRODUCTION PHASE |
|---|---|---|---|---|---|---|
| Z = 0.5 20 wt % of SiC Whiskers | Si₃N₄ + SiC Wiscker + Al(NO₃)₃.9H₂O | 3.16 | 98.3 | 102.2 | 7.2 | β° + O° + SiC |
| Z = 0.5 | Si₃N₄ + α − Al₂O₃ (powder) | 3.14 | 59.8 | 61.1 | 3.6 | β° |
| Z = 0.5 | Si₃N₄ + SiC + Al{OCH(CH₃)₂}₃ | 3.16 | 148.3 | 144.6 | 5.3 | β° + O° ± SiC |

As mentioned above, the following excellent effects are observed in the present invention:
(a) Silicon nitride and silicon carbide are mixed with a solution of aluminum compound, and such mixing is homogeneously achieved. As a result, the strength of the obtained composite sintered bodies becomes remarkably high.
(b) Silicon carbide is mixed into β-sialon. Therefore, compressive stresses arise in the inside of composite sintered bodies, strength and hardness become high, and the properties of the composite sintered bodies such as the electrical conduction, thermal conduction and heat-resisting impact resistance are easily controlled by changing of the amount of silicon carbide added. In this case, there are not observed any lowering of the advantages of oxidation resistance or high temperature strength in β-sialon and silicon carbide.
(c) It is possible to improve the toughness of the composite sintered bodies by using whiskers of fibers of silicon carbide and to obtain a sufficient homogeneous mixture because whiskers or fibers of silicon carbide are contained in the solution.
(d) By hydrolyzing aluminum alkoxide or using an aluminum hydroxide solution, an aluminum hydroxide gel arises in the process of drying, which acts as a binder and facilitates subsequent formation of the sintered body.

What we claim are:

1. A process for producing a β-sialon-silicon carbide composite comprising preparing a starting material by mixing silicon nitride and silicon carbide in a solution of an aluminum compound selected from the group consisting of aluminum alkoxide, aluminum hydroxide and a soluble aluminum salt, and sintering the mixture to obtain a βsialon-silicon carbide composite sintered body.

2. A process as in claim 1, wherein the aluminum compound is colloidal particles of aluminum hydroxide.

3. A process as in claim 1, wherein the aluminum compound is a soluble aluminum salt and further comprising drying the mixture before sintering to deposit aluminum salt on the surface of the silicon nitride and silicon carbide.

4. A process as in claim 3, wherein the soluble aluminum salt is selected from the group consisting of aluminum nitrate, aluminum sulfate, aluminum halide and an organoaluminum carboxylic salt.

5. A process as in claim 1, wherein the aluminum compound is aluminum alkoxide and further comprising hydrolyzing the mixture prior to sintering to convert aluminum alkoxide to aluminum hydroxide.

6. A process as in claim 1, wherein said silicon nitride and said silicon carbide are powders.

7. A process as in claim 1, wherein said silicon carbide is fibers.

8. A process as in claim 1, wherein said silicon carbide is whiskers.

* * * * *